(12) United States Patent
Perez

(10) Patent No.: US 12,256,871 B2
(45) Date of Patent: Mar. 25, 2025

(54) UTENSIL REST

(71) Applicant: Araminda Perez, Citrus Heights, CA (US)

(72) Inventor: Araminda Perez, Citrus Heights, CA (US)

(*) Notice: Subject to any disclaimer, the term of this patent is extended or adjusted under 35 U.S.C. 154(b) by 0 days.

(21) Appl. No.: 17/946,561

(22) Filed: Sep. 16, 2022

(65) Prior Publication Data

US 2023/0088877 A1  Mar. 23, 2023

Related U.S. Application Data

(60) Provisional application No. 63/245,958, filed on Sep. 20, 2021.

(51) Int. Cl.
*A47J 47/16* (2006.01)
*A47G 21/14* (2006.01)

(52) U.S. Cl.
CPC .............. *A47J 47/16* (2013.01); *A47G 21/14* (2013.01)

(58) Field of Classification Search
CPC ...... A47G 21/14; A47G 21/145; A47G 21/16; A47J 47/16; A47L 19/02; A47L 19/04; A61M 5/008; B25H 3/06; B65D 25/10; B65D 25/101; B65D 25/102; B65D 25/103; B65D 25/105; B65D 25/106; B65D 25/107; B65D 25/108; B65D 81/34; B65D 81/36; B65D 81/38; B65D 81/133
USPC .......... 211/41.1, 41.2, 41.3, 41.4, 41.5, 41.6, 211/41.7, 41.8, 41.9, 70.7; 206/553, 557, 206/564, 565; 248/37.3; 119/165, 166, 119/167, 168, 169, 170
See application file for complete search history.

(56) References Cited

U.S. PATENT DOCUMENTS

| | | | |
|---|---|---|---|
| 72,009 A | 12/1867 | Foster | |
| 263,116 A * | 8/1882 | Close | ................... B65D 85/305 |
| | | | 211/74 |
| 333,082 A | 12/1885 | Nichols et al. | |
| 692,259 A * | 2/1902 | Flaskamp | .............. A45C 13/03 |
| | | | 206/561 |

(Continued)

FOREIGN PATENT DOCUMENTS

| | | |
|---|---|---|
| CN | 204071558 Y | 1/2015 |
| KR | 200240977 Y1 | 9/2001 |

(Continued)

*Primary Examiner* — Joshua E Rodden
(74) *Attorney, Agent, or Firm* — John Rizvi; John Rizvi, P.A.—The Patent Professor®

(57) ABSTRACT

A utensil rest is provided for the temporary storage of dirty utensils during cooking or other food preparation procedures. The utensil rest includes a base plate and first and second side walls and first and second end walls extending upwardly from the base plate to define a trough. A plurality of protrusions extend upwardly from an upper surface of the base plate to support a utensil over the trough. The first and second side walls have raised ends and multiple raised intermediate portions between the raised ends. The raised ends and the intermediate portions define valleys therebetween to prevent a utensil from sliding off of the utensil rest. The first and second end walls also have raised ends defining valleys therebetween for the securement of a utensil positioned between the raised ends. The utensil rest is formed from an economical and disposable material.

10 Claims, 11 Drawing Sheets

(56) References Cited

U.S. PATENT DOCUMENTS

| | | | | |
|---|---|---|---|---|
| 840,558 | A | * | 1/1907 | Denmead ............. B65D 85/321 217/57 |
| 1,002,509 | A | * | 9/1911 | Fitz ......................... A61J 19/00 4/258 |
| 1,182,732 | A | | 5/1916 | Avery |
| 1,819,660 | A | * | 8/1931 | Stone ....................... A47J 37/10 D7/354 |
| 1,853,888 | A | * | 4/1932 | Williams ................. C23G 3/00 174/138 R |
| 1,886,075 | A | * | 11/1932 | Zorsch .................... A47G 21/14 248/37.3 |
| 1,915,369 | A | * | 6/1933 | Lane .................. B65D 21/0235 206/509 |
| 2,604,377 | A | * | 7/1952 | Eames ..................... A47L 23/24 15/105 |
| 2,664,005 | A | | 12/1953 | Kosinski |
| 2,941,663 | A | * | 6/1960 | Ettlinger, Jr. ...... A47G 23/0208 206/502 |
| 2,965,226 | A | * | 12/1960 | Ettlinger, Jr. ........... A47L 19/04 217/26 |
| 3,100,483 | A | * | 8/1963 | Altmeyer ............... A61H 7/001 601/28 |
| 3,104,044 | A | * | 9/1963 | Reifers .................... B65D 1/34 D9/425 |
| 3,369,659 | A | * | 2/1968 | Ettlinger, Jr. .......... B65D 71/70 217/26 |
| 3,379,340 | A | * | 4/1968 | Silvio ................ B65D 21/0209 D7/553.6 |
| 3,398,827 | A | * | 8/1968 | Laskin ..................... B65D 1/36 206/541 |
| D223,864 | S | * | 6/1972 | Vines ......................... D32/53.1 |
| D242,052 | S | * | 10/1976 | Ness ........................... D30/129 |
| D244,340 | S | | 5/1977 | Ashton |
| D274,684 | S | | 7/1984 | Norton |
| D276,026 | S | * | 10/1984 | Hexamer ....................... D9/425 |
| D292,861 | S | | 11/1987 | Dorper |
| 4,883,195 | A | * | 11/1989 | Ott ....................... B65D 51/1627 220/366.1 |
| 5,407,648 | A | * | 4/1995 | Allen ......................... A61L 2/26 422/292 |
| D518,248 | S | * | 3/2006 | Northrop ..................... D30/161 |
| D557,570 | S | * | 12/2007 | Shamoon ....................... D7/637 |
| 7,367,449 | B2 | * | 5/2008 | Kaminski ............... A45C 11/16 206/6.1 |
| 7,892,504 | B2 | * | 2/2011 | Taike .................. B01L 3/50855 422/561 |
| D665,232 | S | | 8/2012 | O'Connell et al. |
| D677,443 | S | * | 3/2013 | Urdaneta ....................... D32/55 |
| D682,634 | S | * | 5/2013 | Datavs ........................... D7/698 |
| 8,733,708 | B2 | | 5/2014 | Tarantino et al. |
| 10,299,611 | B1 | * | 5/2019 | O'Malley ................ B65D 1/34 |
| D861,995 | S | * | 10/2019 | Lentz .......................... D30/129 |
| 10,463,226 | B2 | * | 11/2019 | Mesa ..................... A47L 15/503 |
| D887,891 | S | * | 6/2020 | Liu ............................. D11/155 |
| 10,703,559 | B2 | * | 7/2020 | Matos Rodriguez ....................... B65D 81/133 |
| D908,916 | S | * | 1/2021 | Sherman ...................... D24/229 |
| D912,913 | S | * | 3/2021 | Wendling .................... D30/161 |
| D938,659 | S | * | 12/2021 | Ye ............................... D30/121 |
| D962,556 | S | * | 8/2022 | Wu ............................... D30/121 |
| D975,938 | S | * | 1/2023 | Chen ............................ D30/161 |
| D993,545 | S | * | 7/2023 | He .............................. D30/121 |
| 2002/0023855 | A1 | * | 2/2002 | Cho ......................... B25H 3/06 206/372 |
| 2003/0071152 | A1 | * | 4/2003 | Astegno .................. A47J 43/07 241/101.2 |
| 2005/0151049 | A1 | * | 7/2005 | Lion ......................... F25C 1/24 249/127 |
| 2008/0060559 | A1 | | 3/2008 | Holland-Hinrichs |
| 2008/0314771 | A1 | * | 12/2008 | Barbalho ........... B65D 21/0213 206/203 |
| 2009/0314214 | A1 | * | 12/2009 | Miller ................... A01K 1/0152 40/1 |
| 2010/0051500 | A1 | * | 3/2010 | Mendez .................. B65D 5/2033 206/561 |
| 2010/0294734 | A1 | * | 11/2010 | Taike .................. B01L 3/50855 211/85.13 |
| 2011/0114533 | A1 | * | 5/2011 | Le .......................... A47G 21/14 206/553 |
| 2013/0337081 | A1 | * | 12/2013 | Matsumoto ............. A61P 11/00 119/72 |
| 2014/0048428 | A1 | * | 2/2014 | Sakamoto .............. A45C 11/16 206/6.1 |
| 2014/0262922 | A1 | * | 9/2014 | Johnson ................... B25H 3/06 206/565 |
| 2015/0272827 | A1 | * | 10/2015 | Tsukiji ..................... A61J 1/16 206/563 |
| 2017/0348082 | A1 | * | 12/2017 | Ogleby ..................... A01K 13/00 |
| 2019/0002191 | A1 | * | 1/2019 | Abebaw ............... B65D 21/0209 |
| 2020/0399010 | A1 | * | 12/2020 | Velagapudi ............... B65D 1/40 |
| 2022/0322635 | A1 | * | 10/2022 | McCormick ......... A01K 5/0114 |
| 2023/0011990 | A1 | * | 1/2023 | Makos ................... B65D 25/06 |

FOREIGN PATENT DOCUMENTS

| KR | 200451893 Y1 | 1/2011 |
|---|---|---|
| KR | 20150000595 U | 2/2015 |

* cited by examiner

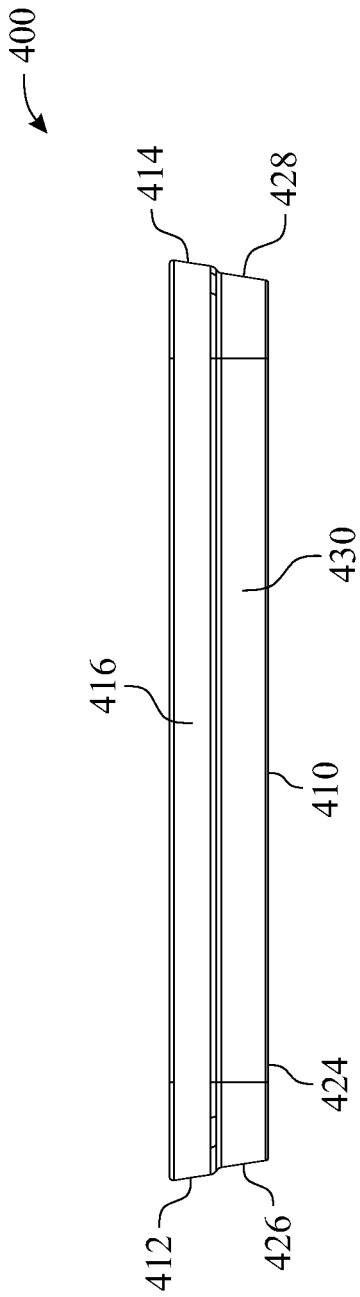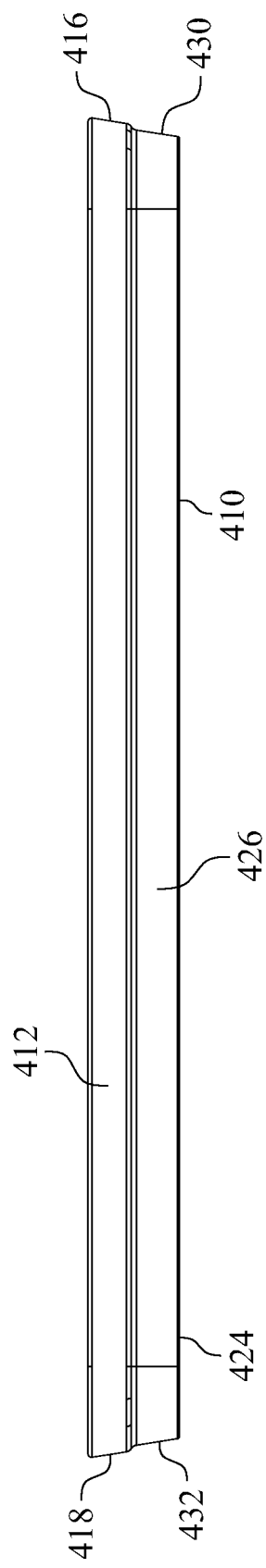

UTENSIL REST

CROSS-REFERENCE TO RELATED APPLICATIONS

This application claims the benefit of U.S. Provisional Patent Application Ser. No. 63/245,958 filed on Sep. 20, 2021, which is incorporated by reference herein in its entirety.

FIELD OF THE INVENTION

The present invention relates generally to kitchen and/or countertop devices, and more particularly, to a utensil rest.

BACKGROUND OF THE INVENTION

Kitchen utensils are routinely used in the preparation and cooking of food. Spoons, knives and forks are used to scoop, cut and pick up food items during their preparation. During their use, the kitchen utensils acquire a covering or coating of food particles and/or fluids. When the utensil is not being used, it may be set down on the surrounding countertop allowing the food particles and/or fluids to fall and/or drain onto the countertop.

The deposition of the food and fluids onto the countertop result in an unsanitary condition that requires the countertop to be cleaned during and after use. This is a time consuming and labor intensive procedure that usually occurs after a meal is consumed and at a time when the user or cook is least inclined to engage in it.

Various devices have been developed to allow the dirty utensils to stay off of direct contact with the countertop. For example, towels may be placed over the countertop to receive the dirty utensils during use. However, these need to be laundered after each use and may allow fluids to seep through resulting in the need for cleaning the countertop anyway.

Utensil rests are available to receive the dirty utensils during use. These are typically permanent kitchen devices formed from a variety of substantial materials such as, for example, ceramics, metals such as stainless steels, etc. While these devices do aid in keeping the kitchen countertop clean, they still require the user or cook to clean them after use in order to keep them sanitary. Additionally, many of these rests are decorative having smooth sides which may allow wet and slippery kitchen utensils to slide off onto the countertops which then also need to be cleaned.

Accordingly, there is need for a solution to at least one of the aforementioned problems. For instance, there is an established need for a utensil rest shaped in such a manner as to prevent slippery and dirty utensils from sliding off of the rest and onto the countertop.

SUMMARY OF THE INVENTION

The present invention is directed to a utensil rest for the temporary storage of dirty utensils during cooking or other food preparation procedure. The utensil rest includes a base plate and first and second side walls and first and second end walls extending upwardly from the base plate to define a trough. A plurality of protrusions extend upwardly from an upper surface of the base plate to support a utensil over the trough. The first and second side walls have raised ends and multiple raised intermediate portions between the raised ends. The raised ends and the intermediate portions define valleys therebetween to prevent a utensil from sliding off of the utensil rest. The first and second end walls also have raised ends defining valleys therebetween for the securement of a utensil positioned between the raised ends.

In a first implementation of the invention, a utensil rest for the temporary storage and draining of kitchen utensils is provided, the utensil rest comprising: a base plate having an upper surface and a lower surface; a first side wall extending upwardly from the base plate; a second side wall extending upwardly from the base plate; a first end wall extending upwardly from the base plate; a second end wall extending upwardly from the base plate; and a plurality of protrusions extending upwardly from the base plate, wherein the base plate, the first side wall, the second side wall, the first end wall and the second end wall define a trough for the receipt of matter draining off of a utensil positioned on the plurality of protrusions.

In a second aspect, the plurality of protrusions are oriented in rows of individual protrusions.

In another aspect, the plurality of protrusions are oriented in columns of individual protrusions.

In another aspect, the individual protrusions form a matrix of protrusions extending upwardly from the upper surface of the base plate.

In another aspect, the individual protrusions have a diamond shaped tip.

In another aspect, the first side wall has a raised end and a raised intermediate portion spaced from the raised end.

In another aspect, the raised end and the raised intermediate portion of the first side wall define a valley therebetween.

In another aspect, the first side wall has an additional raised intermediate portion, the raised intermediate portion and the additional raised intermediate portion defining an additional valley therebetween.

In another aspect, the second side wall has a raised end and a raised intermediate portion spaced from the raised end.

In another aspect, the raised end and the raised intermediate portion of the first side wall define a valley therebetween.

In another aspect, the second side wall has an additional raised intermediate portion, the raised intermediate portion and the additional raised intermediate portion of the second side wall defining an additional valley therebetween.

In another aspect, the first end wall has raised end portions defining a valley therebetween.

In another aspect, the second end wall has raised end portions defining a valley therebetween.

In another aspect, the utensil rest is formed from a paper product.

In another aspect, the utensil rest is formed from a coated paper product.

In another aspect, the utensil rest is formed from a polymeric product.

In another aspect, the utensil rest has a length of about eleven inches.

In another aspect, the utensil rest has a width of about seven and one-half inches.

In another aspect, the utensil rest has a height of about one-quarter of an inch to about one-half of an inch.

In another aspect, the raised intermediate portion of the first side wall is about one quarter of an inch higher than the adjacent valley.

In another aspect, the utensil rest is formed by stamping the utensil rest from a material.

In another aspect, the utensil rest is formed by molding the utensil rest from a material.

In another implementation of the invention, a method of protecting a countertop surface from dirty utensils is provided, the method comprising: providing a utensil rest including a base plate having an upper surface and a lower surface; a first side wall extending upwardly from the base plate; a second side wall extending upwardly from the base plate; a first end wall extending upwardly from the base plate; a second end wall extending upwardly from the base plate; and a plurality of protrusions extending upwardly from the base plate, wherein the base plate, the first side wall, the second side wall, the first end wall and the second end wall define a trough for the receipt of matter draining off of a utensil positioned on the plurality of protrusions; placing the utensil rest on a countertop surface; and positioning a dirty utensil on the utensil rest such that a dirty portion of the dirty utensil is situated on top of the plurality of protrusions and over the trough.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 8 presents an end elevation of the utensil rest of FIG. 7, in accordance with the present invention;

FIG. 9 presents a side elevation of the utensil rest of FIG. 7, in accordance with the present invention;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward at least one embodiment of a utensil rest for use in storing, resting and draining various kitchen utensils during use, generally as shown as at 100 in FIGS. 1 through 6.

Figure 1:
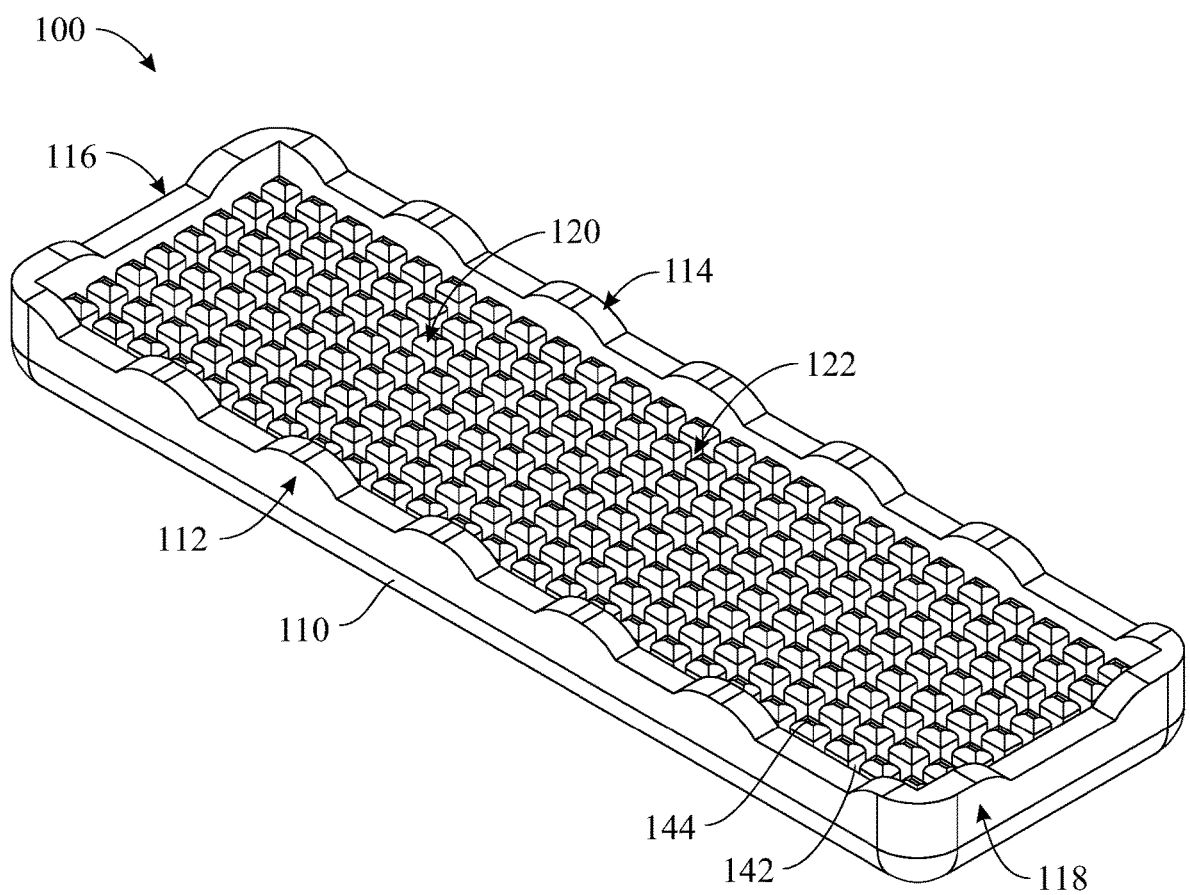
FIG. 1 presents a top perspective view of one illustrative embodiment of a utensil rest for use in temporarily storing and draining a kitchen utensil, in accordance with the present invention.

Referring initially to FIG. 1, a utensil rest for use in various cooking and food preparation procedures, hereinafter utensil rest 100, is illustrated in accordance with an exemplary embodiment of the present invention. The present utensil rest 100 is provided for temporarily resting, storing and/or draining various cooking utensils such as, for example, spoons, ladles, forks, knives, spatulas and the like while cooking and/or during other food preparation procedures. As shown, the utensil rest 100 generally includes a base plate 110 having first side wall 112 and a second side wall 114 extending upwardly from the base plate 110. The utensil rest 100 further includes a first end wall 116 and a second end wall 118 also extending upwardly from the base plate 110. In at least one embodiment, each of the first side wall 112, second side wall 114, first end wall 116 and second end wall 118 are interconnected to one another, as shown throughout the figures.

A plurality of utensil supporting protrusions 120 extend upwardly from the base plate 110 to support the kitchen utensils above the base plate 110 and allow the utensils to rest on and/or drain while not in use. The first and second side walls 112 and 114, respectively, along with the first and second end walls 116 and 118, respectively, together with the base plate 110 define a trough 122 for receipt of fluids and/or debris dripping and/or falling off of a utensil resting on the utensil rest 100. The plurality of protrusions 120 are located within the trough 122 and extend upwardly from the base plate 110 to support a utensil over the trough 122 to allow the utensil to drain into the trough 122.

Figure 2:
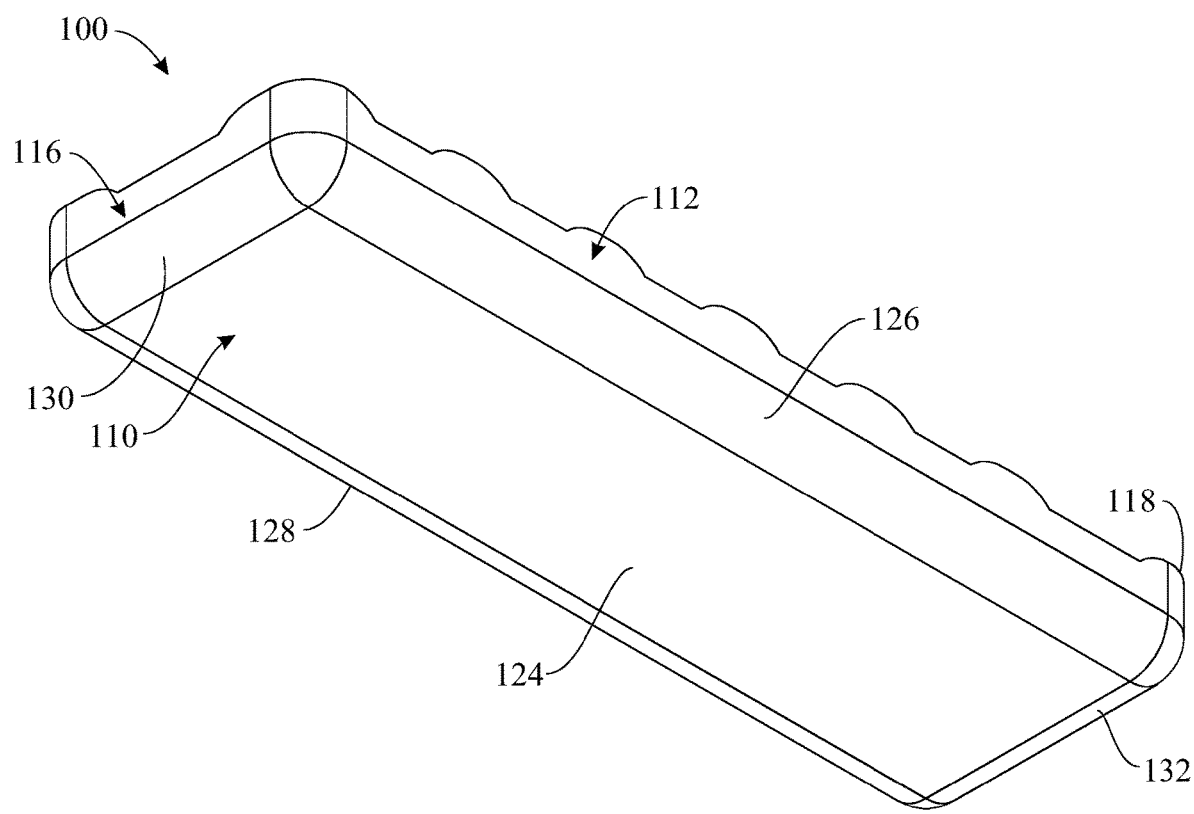
FIG. 2 presents a bottom perspective view of the utensil rest of FIG. 1, in accordance with the present invention.

With reference to FIG. 2, the base plate 110 in at least one embodiment has a flat bottom surface 124 to support and stabilize the utensil rest 100 on a counter or other flat surface. In one further embodiment, the present utensil rest 100 has a first raised side edge 126 extending upwardly from the base plate 110 to the first side wall 112 in a supporting relation. In a similar fashion, the present utensil rest 100 has a second raised side edge 128 extending upwardly from the base plate 110 to the second side wall 114. In addition, in at least one embodiment, the present utensil rest 100 includes first and second raised end edges 130 and 132, respectively, extending upwardly from the base plate 110 to respective first and second end walls 116 and 118 in a supporting relation therewith.

The base plate 110 may be formed integrally with the first and second side walls 112 and 114 and the first and second end walls 116 and 118 or may be formed separately therefrom and affixed thereto in known manner such as, for example, gluing, welding, fusing, etc. Specifically, the first side wall 112 may be formed integrally with or separately from the first raised side edge 126 of the base plate 110 and the second side wall 114 may be formed integrally with or separately from the second side edge 128. Likewise, the first and second end walls 116 and 118 may be formed integrally with or separately from the first and second raised end edges 130 and 132. Similarly, the plurality of protrusions 120 may be formed integrally with or separately from the base plate 110, as disclosed in more detail hereinbelow.

In at least one embodiment, a utensil rest 100 may be formed from any of a variety of disposable materials adequate for a single use or a limited number of uses such as, by way of example only, paper materials such as cardboard, coated paper product and the like. Alternatively, in at least one further embodiment, the utensil rest 100 may be formed from a variety of plastic or polymeric materials suitable for a single use or a limited number of uses. When formed as a single integral unit, the utensil rest 100 may be formed in a variety of manners. For example, the utensil rest 100 may be stamped or cut out of a paper or cardboard like material. Alternatively, the utensil rest 100 may be formed by molding, stamping, and cutting one or more plastic materials. The materials chosen for the utensil rest 100 are of low cost enabling the present utensil rest 100 to be economically disposed of after use.

In one other embodiment, a utensil rest 100 in accordance with the present invention may be constructed of one or more non-disposable materials such that the utensil rest 100 may be cleaned and reused repeatedly. As one example, a non-disposable material of construction for a utensil rest 100 in accordance with the present invention may include aluminum foil, polyethylene terephthalate, also known as PET, silicone, plastics, including but not limited to thermoplastic resins and thermoset resins, thermoplastic rubber and/or synthetic rubber, just to name a few.

Figure 3:
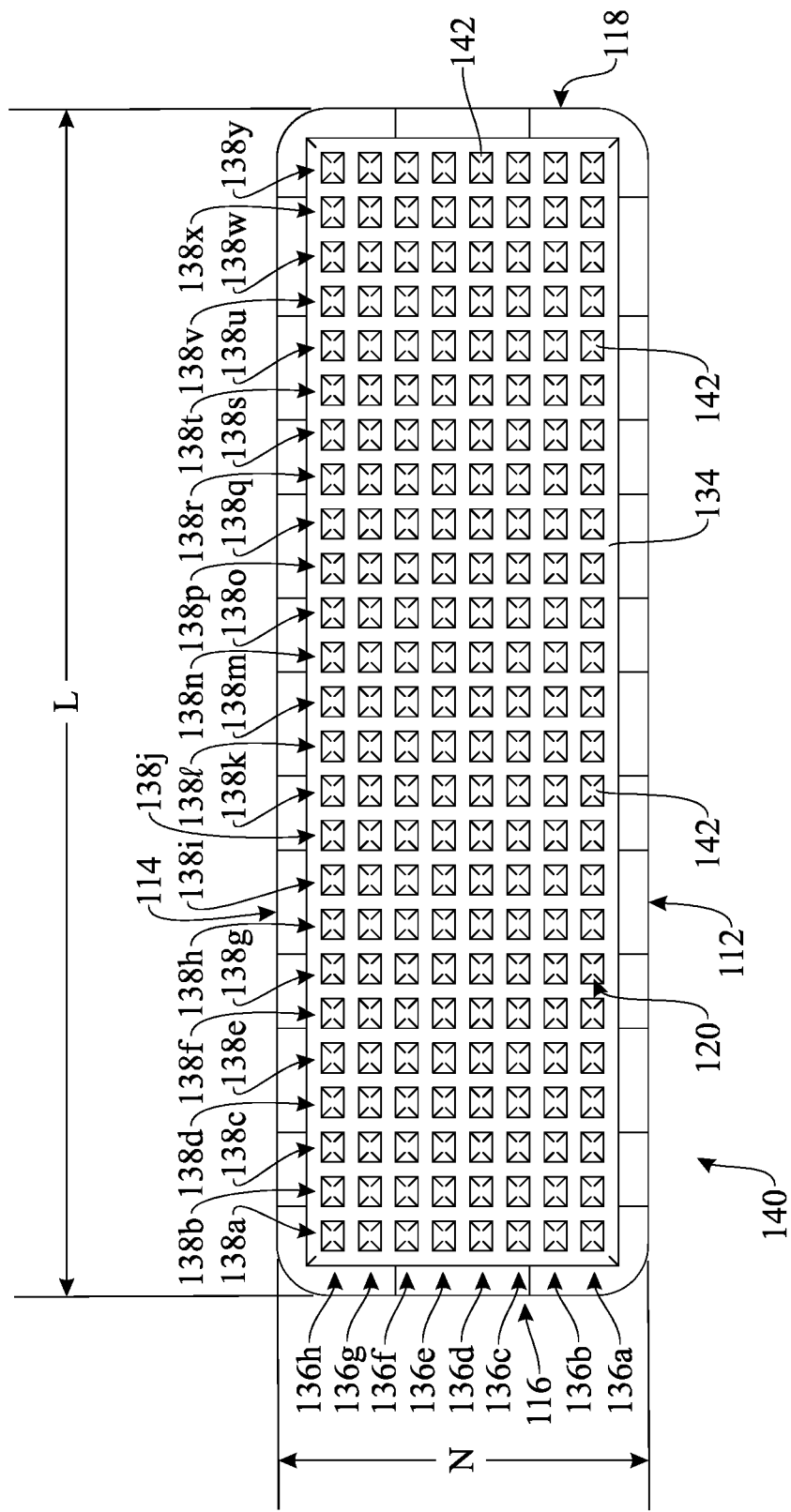
FIG. 3 presents a top plan view of the utensil rest of FIG. 1, in accordance with the present invention.

As best shown in FIG. 3, a plurality of protrusions 120 extend upward from an upper surface 134 of the base plate 110. In at least one embodiment, the plurality of protrusions 120 are symmetrically aligned in multiple rows 136a-h and columns 138a-y to form a matrix 140 of individual protrusions 142. In the illustrative embodiment of FIG. 3, the matrix 140 includes eight rows and twenty-five columns comprising two hundred individual and equally spaced protrusions 142 for support of utensils rested thereon. As shown, the individual protrusions 142 are generally rectangular shaped having a diamond shaped peak 144, as seen best in FIG. 1, to support one or more utensils resting thereon. While not specifically shown, the individual protrusions 142 rise a predetermined height above the upper surface 134 of the base plate 110.

Figure 4:
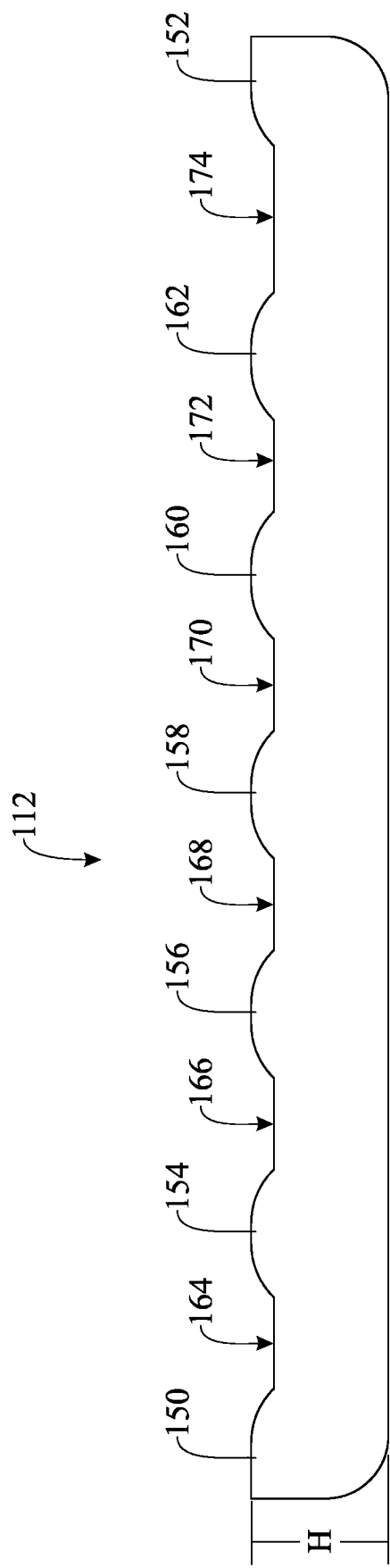
FIG. 4 presents a side elevation of the utensil rest of FIG. 1, in accordance with the present invention.

As shown in FIG. 3, the utensil rest 100 has a length L, which in one embodiment is about six to twelve inches, and a width W which is about three to nine inches. The utensil rest 100 has a height H, as shown in FIG. 4, which in one embodiment is about one-quarter of an inch to about one-half of an inch. It is to be appreciated that a utensil rest 100 in accordance with the present invention may comprise other physical dimensions and/or geometric configurations.

With continued reference to FIG. 4, in order to prevent a utensil placed on the utensil rest 100 from sliding off of the utensil rest 100, a first side wall 112 includes raised ends 150 and 152 and raised intermediate portions 154, 156, 158, 160 and 162 positioned between the raised ends 150 and 152. The raised end 150 and the raised intermediate portion 154 define a valley 164 therebetween. The valley 164 is provided to receive a portion of a utensil between the raised end 150 and the raised intermediate portion 154, extending upward of the valley 164, to prevent the utensil from sliding off of the utensil rest 100. The raised end 150 extends approximately one-quarter of an inch above the valley 164.

Similarly, respective valleys 166, 168, 170, 172 and 174 are defined between the raised portions 154, 156, 158, 160, 162 and raised end 152, respectively, and operate in similar manner to prevent a utensil placed on the utensil rest 100 from sliding off of the utensil rest 100. In this manner, the first side wall 112 not only retains fluids and other debris within the trough 122 of the utensil rest 100, but the first side wall 112 prevents a utensil placed on the present utensil rest 100 from sliding off of the utensil rest 100 during use.

Figure 5:
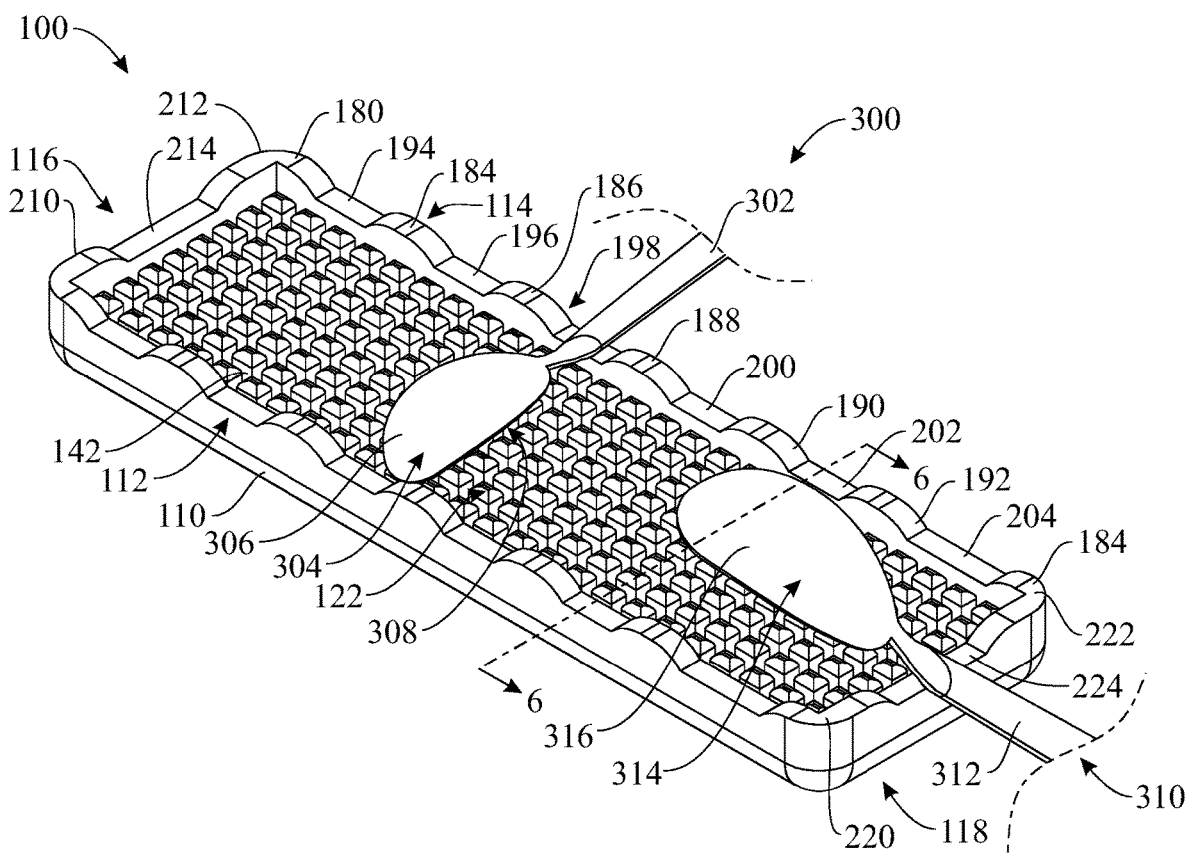
FIG. 5 presents a top perspective view of the utensil rest of FIG. 1 with a pair of spoons positioned on the utensil rest for temporary storage and drainage, in accordance with the present invention.

Referring now to FIG. 5, in at least one embodiment, the second side wall 114 also includes raised ends 180 and 182 and raised intermediate portions 184, 186, 188, 190 and 192 disposed therebetween. The raised end 180 and the raised intermediate portion 184 define a valley 194 therebetween for receipt of a utensil. Likewise, the respective raised intermediate portions 184, 186, 188, 190, 192 and raised end 182 define valleys 196, 198, 200, 202 and 204, respectively, therebetween for receipt of utensils.

In similar manner, the first end wall 116 has raised ends 210 and 212 defining a single valley 214 therebetween for receipt of a utensil lengthwise in the utensil rest 100. Likewise, the second end wall 118 includes raised ends 220 and 222 defining a valley 224 therebetween for receipt of a kitchen utensil as discussed in more detail hereinbelow.

Figure 6:
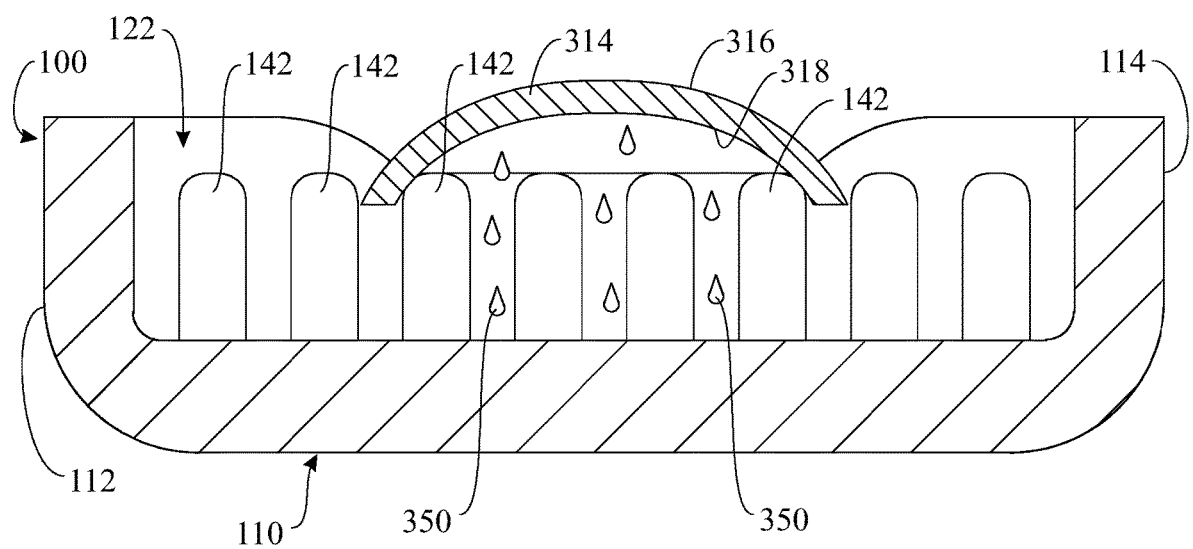
FIG. 6 presents a cross-sectional view of the utensil rest of FIG. 5 along lines 6-6 thereof, in accordance with the present invention.

With reference to FIGS. 5 and 6, while in use, the utensil rest 100 is positioned on a flat surface adjacent a cooking and/or food preparation area. A first utensil, such as, for example, a spoon 300 having an elongated handle 302 and a rounded spoon body 304 is used in the cooking and/or preparation of food. For example, the spoon 300 may be used to add flour or granulated spices to food, to add or remove liquids and/or fats to and from food, etc. When the user needs to set the spoon 300 down, for example to perform other functions, the spoon 300 is set on the utensil rest 100 until it is needed further.

In a specific method of use, the spoon 300 is turned upside down such that a convex surface 306 of the spoon body 304 faces up and a concave surface 308 of the spoon body 304 faces down. As best shown in FIG. 5, the spoon 300 is positioned between two of the raised intermediate portions, for example, between the raised intermediate portions 186, 188 of the second side wall 114.

Thereafter, the spoon 300 is set down so that the elongate handle 302 of the spoon 300 is positioned and retained in the valley 198 between the raised intermediate portions 186, 188 and the spoon body 304 rests on top of the individual protrusions 142 in the matrix 140 comprised of a plurality of protrusions 142, as shown. The raised intermediate portions 186, 188 prevent the spoon 300 from sliding off of the utensil rest 100 while the individual protrusions 142 of the utensil rest 100 allow food, debris and/or fluids to drain off of the spoon body 304 and into the trough 122 of the utensil rest 100.

In an alternative method of use, a second spoon 310 having an elongate handle 312 and a spoon body 314 having a convex upper surface 316 and a concave lower surface 318 is positioned over the second end wall 118 of the utensil rest 100. The spoon 310 is set down on the utensil rest 100 such that the elongate handle 312 of the spoon 310 is positioned and retained in the valley 224 positioned between the raised ends 220, 222 of the second end wall 118. Similar to the raised intermediate portions 186, 188 of the second side wall 114 described hereinabove, the raised ends 220, 222 of the second end wall 118 prevent the spoon 310 from sliding off of the utensil rest 100.

As best shown in FIG. 6, the spoon body 314 of the spoon 310 is set down on the plurality of protrusions 142 of the utensil rest 100. Specifically, the concave lower surface 318 of the spoon 310 is set down on the individual protrusions 142 extending upwardly from the base plate 112. This allows any fluids, debris and/or other food particles, such as for example, fluids 350 to drip off of the spoon 310 and into the trough 122 of the utensil rest 100. The fluids 350 draining into the trough 122 are retained therein and are thus not spilled or otherwise deposited on the counter surface to keep the counter clean.

It should be noted that, while the illustrated figures show two spoons of a specific size, multiple utensils of varying or differing sizes are easily accommodated on the present utensil rest 100 utilizing the multiple raised areas and valleys therebetween. For example, the present utensil rest 100 is contemplated to temporarily store and drain very large spoons, ladles, spatulas, cleavers as well as conventional knives and forks of differing sizes and the like.

When the cooking and/or food preparation procedures are done and the utensil rest 100 is no longer needed, it can simply be disposed of properly by depositing the utensil rest 100 in a suitable waste receptacle. Thus, the present utensil rest 100 provides a useful, economical and disposable article on which utensils may be placed while cooking and/or during food preparation procedures, thereby keeping the underlying countertop surfaces clean.

The present invention is further directed toward at least one alternative embodiment of a utensil rest for use in storing, resting and draining various kitchen utensils during use, generally as shown as at 400 in FIGS. 7 through 12.

Figure 7:
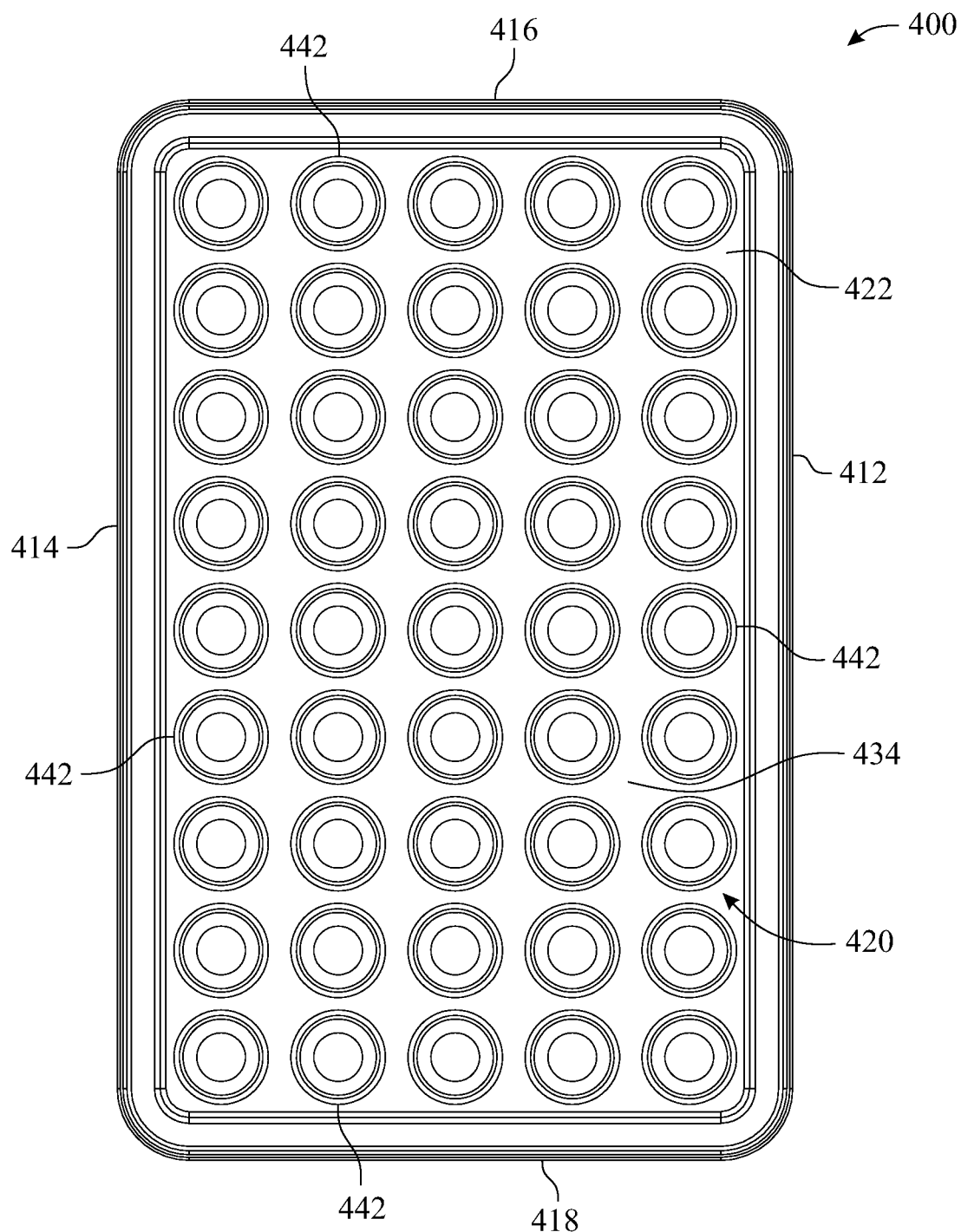
FIG. 7 presents a top plan view of one alternative illustrative embodiment of a utensil rest for use in temporarily storing and draining a kitchen utensil, in accordance with the present invention.

Referring initially to FIG. 7, one alternative embodiment of a utensil rest 400 for use in various cooking and food preparation procedures is illustrated in accordance with an exemplary embodiment of the present invention. The present utensil rest 400 is provided for temporarily resting, storing and/or draining various cooking utensils such as, for example, spoons, ladles, forks, knives, spatulas and the like while cooking and/or during other food preparation procedures. As shown, the utensil rest 400 generally includes a base plate 410 having first side wall 412 and a second side wall 414 extending upwardly from the base plate 410. The utensil rest 400 further includes a first end wall 416 and a second end wall 418 also extending upwardly from the base plate 410. In at least one embodiment, each of the first side wall 412, second side wall 414, first end wall 416 and second end wall 418 are interconnected to one another, as shown throughout the figures.

A plurality of utensil supporting protrusions 420 extend upwardly from the base plate 410 to support the kitchen utensils above the base plate 410 and allow the utensils to rest on and/or drain while not in use. As before, the first and second side walls 412 and 414, along with the first and second end walls 416 and 418, respectively, together with the base plate 410 define a trough 422 for receipt of fluids and/or debris dripping and/or falling off of a utensil 500 resting on the utensil rest 400. The plurality of protrusions 420 are located within the trough 422 and extend upwardly from the base plate 410 to support one or more utensils 500 over the trough 422 to allow the utensil to drain into the trough 422, such as is shown by way of example only in FIGS. 11 and 12.

With reference to FIGS. 8 and 9, the base plate 410 in at least one embodiment has a flat bottom surface 424 to support and stabilize the utensil rest 400 on a counter or other flat surface. In one further embodiment, the present utensil rest 400 has a first raised side edge 426 extending upwardly from the base plate 410 to the first side wall 412 in a supporting relation. In a similar fashion, the present utensil rest 400 has a second raised side edge 428 extending upwardly from the base plate 410 to the second side wall 414. In addition, in at least one embodiment, the present utensil rest 400 includes first and second raised end edges 430 and 432, respectively, extending upwardly from the base plate 410 to first and second end walls 416 and 418, respectively, in a supporting relation therewith.

As before, the base plate 410 may be formed integrally with the first and second side walls 412 and 414 and the first and second end walls 416 and 418, respectively, or the base plate 410 may be formed separately therefrom and affixed thereto in known manner such as, for example, gluing, welding, fusing, etc. Specifically, the first side wall 412 may be formed integrally with or separately from the first raised side edge 426 of the base plate 410 and the second side wall 414 may be formed integrally with or separately from the second side edge 428. Likewise, the first and second end walls 416 and 418 may be formed integrally with or separately from the first and second raised end edges 430 and 432, respectively. Similarly, and as before, the plurality of protrusions 420 may be formed integrally with or separately from the base plate 410.

As with the illustrative embodiment of FIGS. 1 through 6, in at least one embodiment, a utensil rest 400 may be formed from any of a variety of disposable materials adequate for a single use or a limited number of uses such as, by way of example only, paper materials such as cardboard, coated paper product and the like. Alternatively, in at least one further embodiment, the utensil rest 400 may be formed from a variety of plastic or polymeric materials suitable for a single use or a limited number of uses. When formed as a single integral unit, the utensil rest 400 may be formed in a variety of manners. For example, the utensil rest 400 may be stamped or cut out of a paper or cardboard like material. Alternatively, the utensil rest 400 may be formed by molding, stamping, and cutting one or more plastic materials. The materials chosen for the utensil rest 400 are of low cost enabling the present utensil rest 400 to be economically disposed of after use.

In one other embodiment, a utensil rest 400 in accordance with the present invention may be constructed of one or more non-disposable materials such that the utensil rest 400 may be cleaned and reused repeatedly. As one example, a non-disposable material of construction for a utensil rest 400 in accordance with the present invention may include aluminum foil, polyethylene terephthalate, also known as PET, silicone, plastics, including but not limited to thermoplastic resins and thermoset resins, thermoplastic rubber and/or synthetic rubber, just to name a few.

Figure 10:
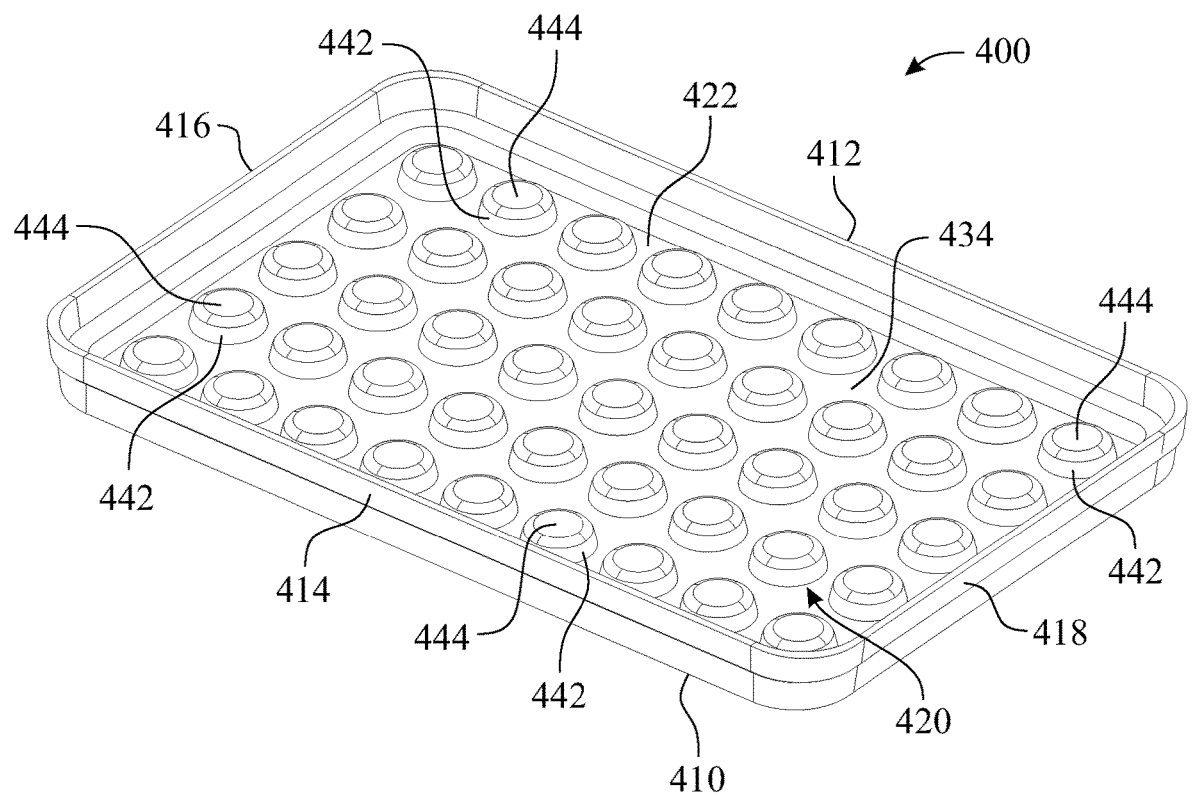
FIG. 10 presents a top perspective view of the utensil rest of FIG. 7, in accordance with the present invention.

As best shown in FIG. 10, a plurality of protrusions 420 extend upward from an upper surface 434 of the base plate 410. In at least one embodiment, the plurality of protrusions 420 are symmetrically aligned in multiple rows and columns to form a matrix of individual protrusions 442. In the illustrative embodiment of FIG. 10, the matrix of individual protrusions 442 includes nine rows and five columns comprising forty-five individual and equally spaced individual protrusions 442 for support of utensils rested thereon. As shown, the individual protrusions 442 are generally round shaped having a flat peak 444, as seen best in FIG. 10, to support one or more utensils resting thereon. While not specifically shown, the individual protrusions 442 rise a predetermined height above the upper surface 434 of the base plate 410.

As before, in at least one embodiment, the utensil rest 400 has a length which is about six to twelve inches, and a width which is about three to nine inches. The utensil rest 400 has a height which in one embodiment is about one-quarter of an inch to about one-half of an inch. Once again, it is to be appreciated that a utensil rest 400 in accordance with the present invention may comprise other physical dimensions and/or geometric configurations.

Figure 11:
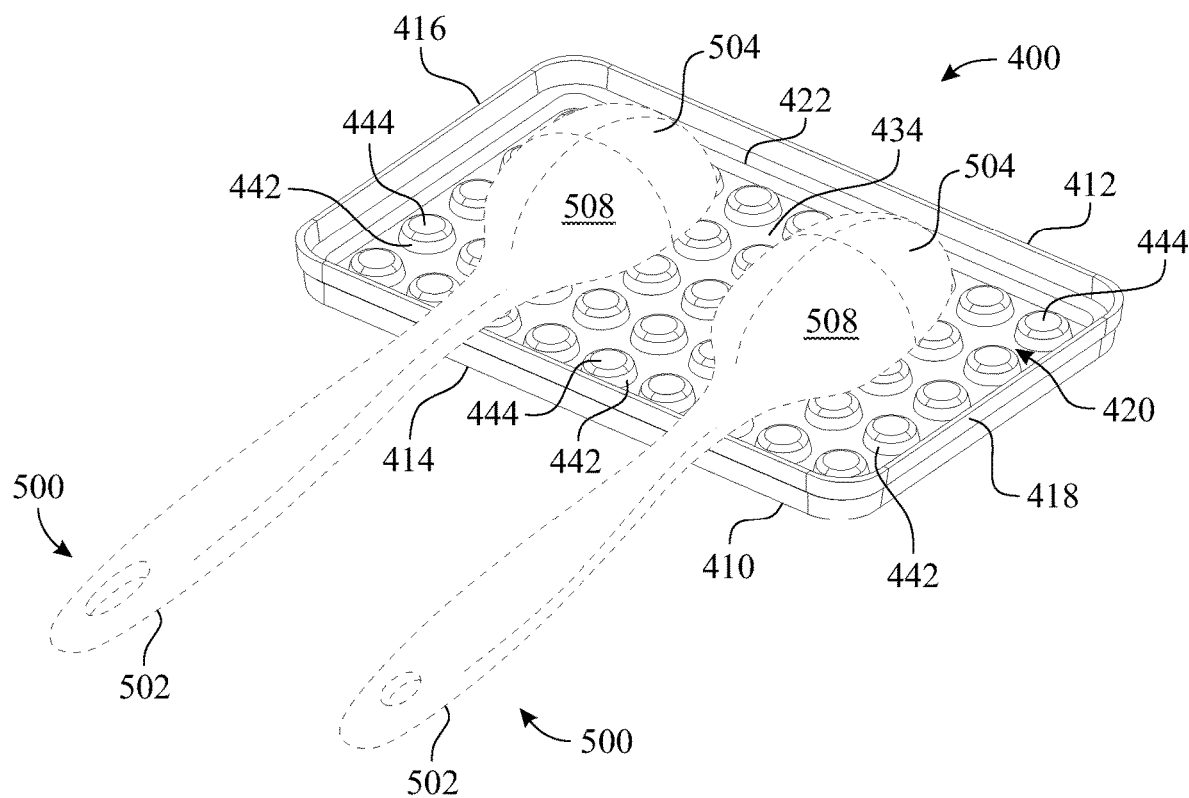
FIG. 11 presents a top perspective view of the utensil rest of FIG. 7 with a pair of utensils positioned on the utensil rest for temporary storage and drainage, in accordance with the present invention.
Figure 12:
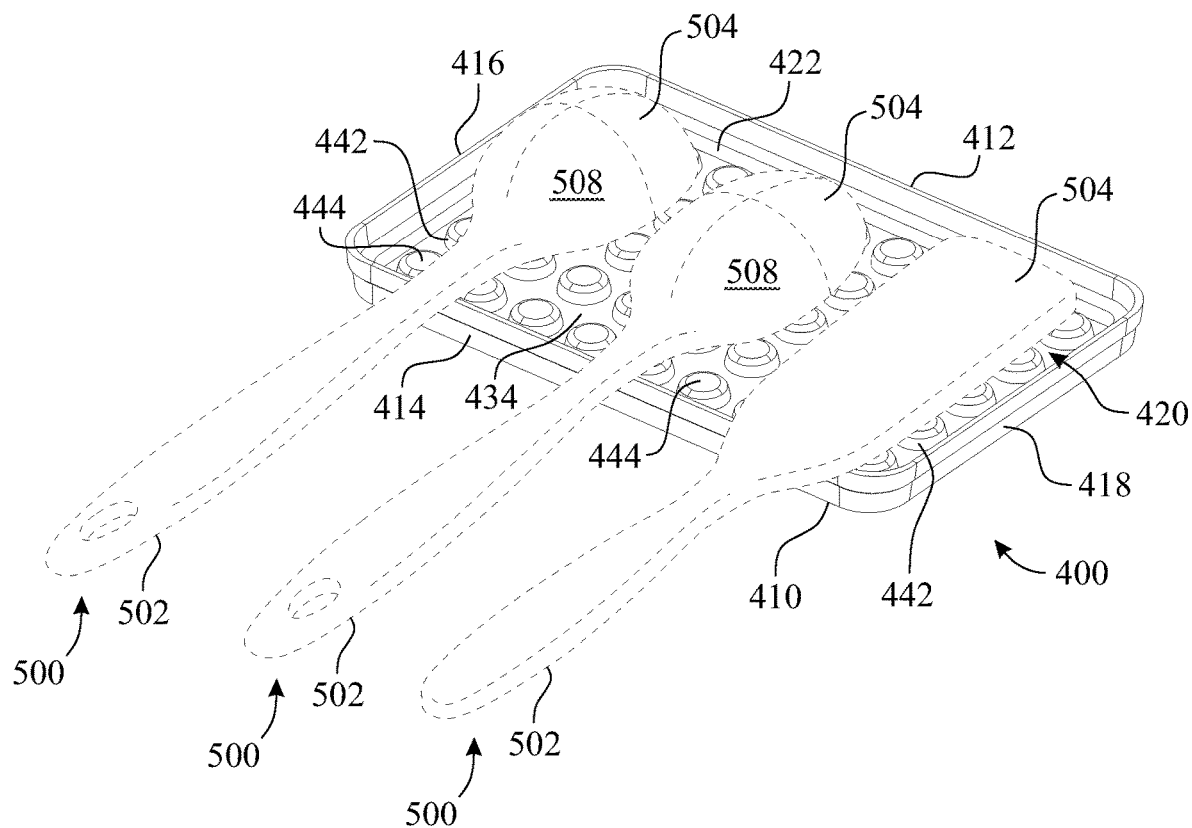
FIG. 12 presents a top perspective view of the utensil rest of FIG. 7 with three utensils positioned on the utensil rest for temporary storage and drainage, in accordance with the present invention.

With reference to FIGS. 11 and 12, while in use, the alternative utensil rest 400 is positioned on a flat surface adjacent a cooking and/or food preparation area. A first utensil 500, such as, for example, a spoon, having an elongated handle 502 and a body 504 is used in the cooking and/or preparation of food. For example, the utensil 500 may be used to add flour or granulated spices to food, to add or remove liquids and/or fats to and from food, etc. When the user needs to set the utensil 500 down, for example to perform other functions, the utensil 500 is set on the utensil rest 400 until it is needed further.

In a specific method of use, wherein the utensil 500 comprises a spoon, such as is shown in the illustrative embodiment of FIG. 11, the utensil 500 is turned upside down such that a convex upper surface 508 of the body 504 faces up and a concave lower surface of the body 504 faces down. A utensil 500 for use with the present invention may comprise a spatula having a body 504 with generally planar upper and lower surfaces, such as may be seen in the illustrative embodiment of FIG. 12.

As further shown in FIGS. 11 and 12, the body 504 of the utensil 500 is set down on the plurality of protrusions 442 of the utensil rest 400. Specifically, the body 504 of the utensil 500 is set down on the individual protrusions 442 extending upwardly from the base plate 410 such that a convex upper surface 508 faces upwardly from the plurality of individual protrusions 442. This allows any fluids, debris and/or other food particles, etc., to drip off of the utensil 500 and into the trough 422 of the utensil rest 400. The fluids, debris, etc., draining into the trough 422 are retained therein and are thus not spilled or otherwise deposited on the counter surface to keep the counter clean.

It should be noted that while FIGS. 11 and 12 show utensils 500 of a specific size relative to the utensil rest 400, multiple utensils of varying or differing sizes are easily accommodated on the present utensil rest 400. For example, the present utensil rest 400 is contemplated to temporarily store and drain very large spoons, ladles, spatulas, cleavers as well as conventional knives and forks of differing sizes and the like.

As before, when the cooking and/or food preparation procedures are done and the utensil rest 400 is no longer needed, it can simply be disposed of properly by depositing the utensil rest 400 in a suitable waste receptacle. Thus, the present alternative utensil rest 400 also provides a useful, economical and disposable article on which utensils may be placed while cooking and/or during food preparation procedures, thereby keeping the underlying countertop surfaces clean.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A utensil rest for temporary placement of one or more kitchen utensils thereon during food preparation and cooking, the utensil rest comprising:
   a base plate having an upper surface and a lower surface;
   a first side wall extending upwardly from and interconnected to said base plate;
   a second side wall extending upwardly from and interconnected to said base plate;
   a first end wall extending upwardly from and interconnected to said base plate;
   a second end wall extending upwardly from and interconnected to said base plate;
   a trough formed by said base plate, said first side wall, said second side wall, said first end wall and said second end wall;
   a plurality of protrusions extending upwardly from said upper surface of said base plate to at least partially retain the one or more kitchen utensils thereon, said plurality of protrusions having a rounded shape and a flat peak adapted to support the one or more utensils resting thereon, wherein solid and/or liquid droppings from the one or more kitchen utensils placed on said plurality of protrusions are collected and retained in said trough;
   a first raised side edge extending upwardly from said base plate to said first side wall, wherein said first raised side edge connects said base plate to said first side wall;
   a second raised side edge extending upwardly from said base plate to said second side wall, wherein said second raised side edge connects said base plate to said second side wall;
   a first raised end edge extending upwardly from said base plate to said first end wall, wherein said first raised end edge connects said base plate to said first end wall; and
   a second raised end edge extending upwardly from said base plate to said second end wall, wherein said second raised end edge connects said base plate to said second end wall, and wherein the first raised side edge, the second raised side edge, the first raised end edge, the second raised end edge provides structural support to the utensil rest,
   wherein the upper surface of the base plate between the plurality of protrusions is uninterrupted, and wherein each of the first raised side edge, the second raised side edge, the first raised end edge and the second raised end edge is perpendicular to the base plate.

2. The utensil rest as recited in claim 1, wherein one or more of said base plate, said first side wall, said second side wall, said first end wall, and said second end wall is constructed of a disposable material of construction.

3. The utensil rest as recited in claim 1, wherein each of said base plate, said first side wall, said second side wall, said first end wall, and said second end wall is constructed of a disposable paper material of construction.

4. The utensil rest as recited in claim 1, wherein each of said base plate, said first side wall, said second side wall, said first end wall, and said second end wall is constructed of a disposable coated paper material of construction.

5. The utensil rest as recited in claim 1, wherein each of said base plate, said first side wall, said second side wall, said first end wall, and said second end wall is constructed of a disposable polymeric material of construction.

6. The utensil rest as recited in claim 1, wherein each of said base plate, said first side wall, said second side wall, said first end wall, and said second end wall is constructed of a non-disposable material of construction.

7. The utensil rest as recited in claim 1, wherein said plurality of protrusions arranged in a plurality of columns and a plurality of rows.

8. The utensil rest as recited in claim 6, wherein said plurality of protrusions are formed of a disposable material.

9. The utensil rest as recited in claim 6, wherein said plurality of protrusions are formed separately of said base plate, said first side wall, said second side wall, said first end wall, and said second end wall and are subsequently attached thereto.

10. The utensil rest as recited in claim 6, wherein said plurality of protrusions are formed integrally with said base plate, said first side wall, said second side wall, said first end wall, and said second end wall.

* * * * *